Patented Mar. 6, 1928.

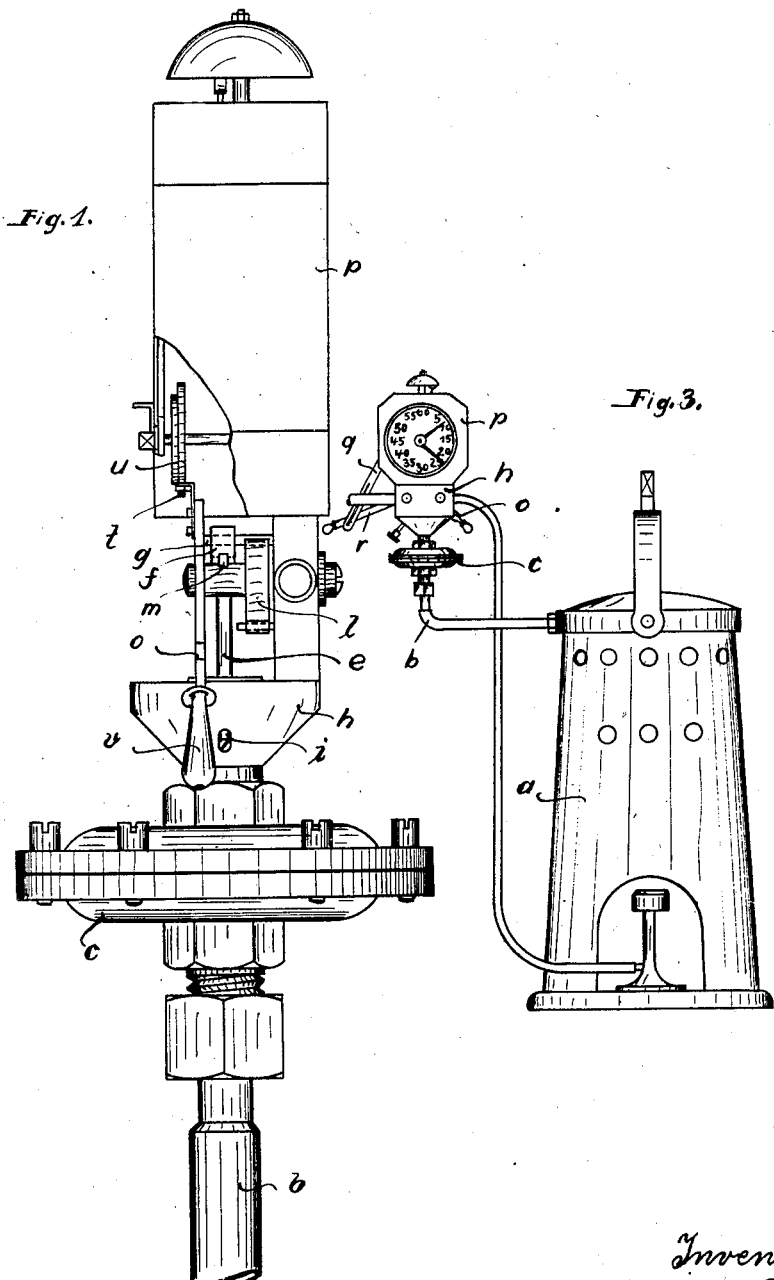

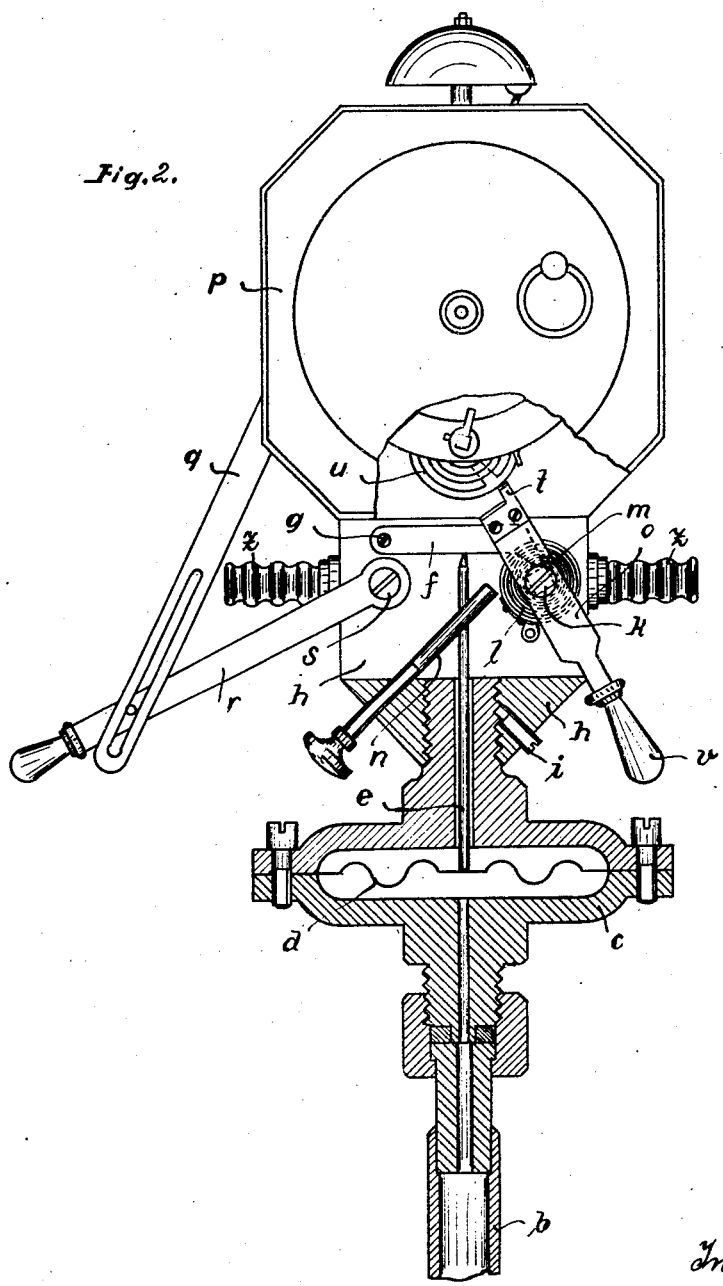

1,661,252

UNITED STATES PATENT OFFICE.

RICHARD FRICKE, OF LEIPZIG-KLEINZSCHOCHER, AND HANS MROSS, OF PRETZSCH-ON-THE-ELBE, GERMANY.

GAS-CONTROL APPARATUS.

Application filed October 21, 1925, Serial No. 64,061, and in Germany August 6, 1924.

Our invention refers to control apparatus for gas supplying systems and more especially to means for controlling gas heaters, employed for instance in heating vulcanizers and other closed vessels in which steam or gases are developed in consequence of the heat treatment. It is an object of our invention to provide a control device which renders permanent attendance to vulcanizers as used for instance in dental laboratories and similar apparatus unnecessary, the regulation of gas supply for the heating of such vulcanizers and the like being controlled automatically.

According to the present invention the pressure of the steam generated in the vulcanizer or the like is made to act on a displaceable member which is arranged to act on a valve or the like inserted in the gas supply and on an alarm in such manner that as the pressure in the vulcanizer rises, the supply of gas is reduced and the alarm is set operating.

The displaceable member need not be one which is displaced bodily as a whole, such as a piston or the like, but it may be for instance a metal or other diaphragm, deformed by the steam pressure, so that only one part of it is displaced.

In the drawings affixed to this specification and forming part thereof a device embodying our invention is illustrated diagrammatically by way of example.

In the drawings

Fig. 1 is a side elevation, and

Fig. 2 is a rear elevation, partly in cross-section, drawn to a larger scale, while Fig. 3 is an elevation showing the combination of the same device with a dental vulcanizer.

In the modification illustrated in the drawings the alarm is represented by an alarm clock which on the gas valve or cock having been operated will after a predetermined period of time be operated to notify the attendant and will at the same time cut out the gas supply entirely.

Referring to the drawings, $a$ is the vulcanizer and $b$ is a pipe leading from the steam space of the vulcanizer to a case $c$ surrounding a metal diaphragm $d$, on the under side of which the pressure of the steam generated in $a$ acts so as to cause the deformation of the diaphragm. On the upper side of the diaphragm rests a movable pin $e$, the top end of which is applied against a lever $f$ pivotally mounted on the part $h$ by means of pivot pin $g$. The part $h$ is screwed on to the case $c$ so as to be vertically displaceable thereon and $i$ is a screw serving to fix part $h$ in position on the case $c$.

$z$, $z$ are tube nipples communicating with each other across the part $h$ for inserting the device in the gas supply of the vulcanizer and $k$ is an admission valve inserted in the boring connecting the two nipples. $l$ is a spiral spring mounted on the valve spindle and tending to close the valve. When the vulcanizer is heated up, the valve $k$ assumes the position shown in the drawings, in which the gas is free to pass through from one nipple to the other, a check $m$ on the valve spindle resting against the free end of the lever $f$ preventing the spring $l$ from turning and closing the valve.

When the steam pressure in the vulcanizer rises, the diaphragm $d$ is gradually deformed in upward direction and pin $e$ will consequently move lever $f$ gradually so as to release check $m$, whereby the spring $l$ is allowed to turn the valve spindle $k$ and to reduce the free cross-sectional area of the gas passage. A pin $n$ screwed into the part $h$ extends into the path of the hand lever $o$ mounted on the valve spindle $k$ and prevents this latter from being turned far enough to altogether close the gas supply.

In the position determined by the pin $n$ the valve $k$ allows a quantity of gas to pass through, which corresponds to the generation of a predetermined steam pressure which is intended to prevail in the vulcanizer $a$ during a predetermined time after heating has been started. By adjusting pin $n$ this position of valve $k$ can be varied. On the other hand part $h$ can be adjusted vertically by turning it on part $c$ so as to vary the distance between the diaphragm $d$ and the lever $f$, whereby this latter causes valve $k$ to be released at a greater or smaller steam pressure.

On part $h$ is mounted an alarm clock $p$, the alarm spindle of which carries a slotted lever $q$ embracing a lever $r$ which is fixed on a stop cock $s$ mounted in the boring connecting the nipples $z$, $z$.

On the lever $o$ mounted on the spindle of valve $h$ is further mounted a resilient brake arm $t$ which in the position shown in the drawing applies itself against the governor (balance wheel) *u* of the clock in such manner as to brake it and prevent it from moving, thereby stopping the clock work. However as soon as lever *f* releases valve *k* lever *o* will be rocked until it meets pin *n* and in doing so, the brake member *t* will not only release the governor *u*, but it will also positively actuate it by carrying it along in its angular movement and will thereby set the clock work working. After the lapse of time for which the alarm has been set, it will operate so as to advise the attendant and at the same time lever *q* will act on lever *r* so as to close the stop cock *s*, thereby cutting out the gas supply altogether.

In order to render the device operative again, valve *k* need merely be turned by means of handle *v* mounted on the lever *o*, until lever *f* has come to rest against the check *m*. At the same time the stop cock *s* is opened by means of lever *r*.

In some cases it may prove sufficient to merely provide for an automatic throttling of the gas supply, the operation of the throttling member being accomplished by the actuation of an alarm which advises the attendant that after a predetermined period of time the gas supply must be interrupted altogether.

We wish it to be understood that we do not desire to be limited to the exact details of construction shown and described for obvious modifications will occur to a person skilled in the art.

We claim:—

1. Gas control apparatus for vulcanizers and the like comprising a member displaceable by steam pressure, a gas valve influenced by said member, an alarm influenced by said valve, a closing spring connected with said valve and a locking member for said spring arranged to be thrown out by said displaceable member.

2. Gas control apparatus for vulcanizers and the like comprising a member displaceable by steam pressure, a gas admission valve influenced by said member, an alarm clock, a regulator forming part of said clock and means connected with said gas admission valve for braking said regulator as long as said valve is open and for positively actuating said regulator, when it is being closed.

3. Gas control apparatus for vulcanizers and the like comprising a member displaceable by steam pressure, a gas admission valve influenced by said member, an alarm clock, a regulator forming part of said clock and a lever fixed to said valve, a resilient part on said lever normally applied against said regulator so as to brake same, the position of said resilient part relative to said regulator being such that on releasing said regulator said resilient part will positively actuate said regulator.

4. Gas control apparatus for vulcanizers and the like comprising a member displaceable by steam pressure, a gas valve influenced by said member, an alarm influenced by said valve, a closing spring connected with said valve, a locking member for said spring arranged to be thrown out by said displaceable member and an adjustable stop for limiting the closing movement of said valve.

In testimony whereof we have affixed our signatures.

DR. RICHARD FRICKE.
HANS MROSS.